No. 797,254. PATENTED AUG. 15, 1905.
A. BEER.
MEANS FOR TRANSMITTING ELECTRICITY TO VEHICLES ON ELECTRIC RAILWAYS.
APPLICATION FILED AUG. 18, 1902.
2 SHEETS—SHEET 1.
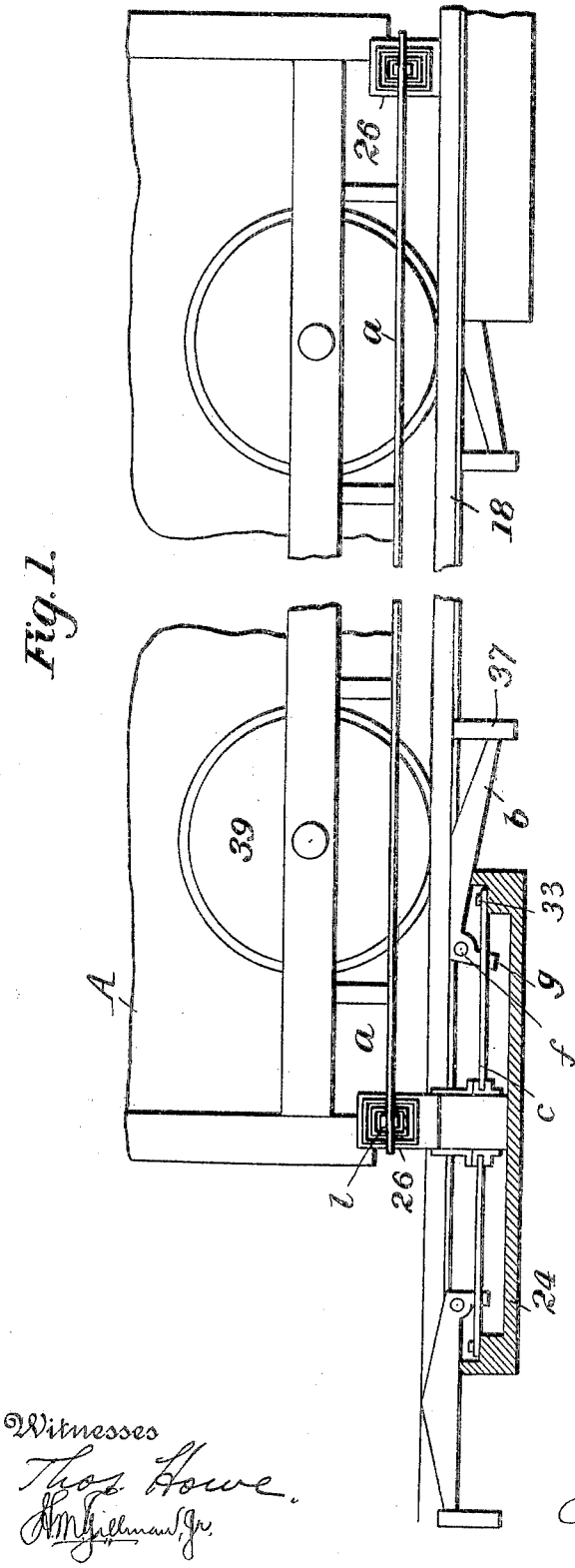
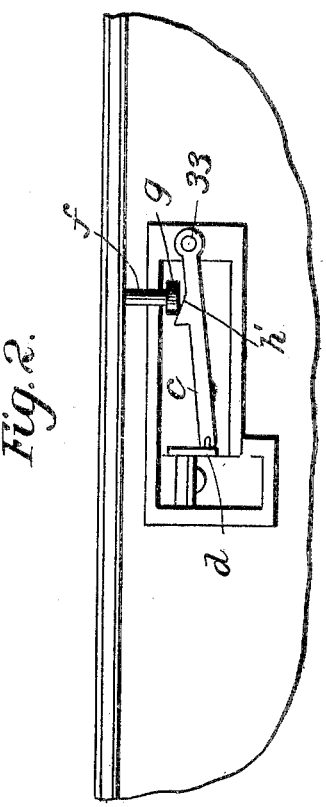
Witnesses
Thos. Howe.
H. M. Gillman, Jr.
Inventor
Attilio Beer
by Foster Freeman
Attorneys

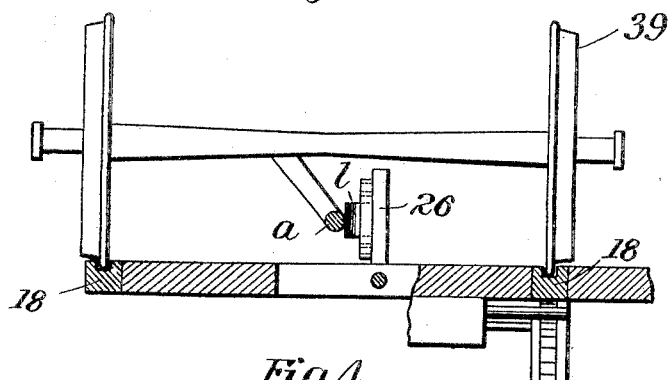
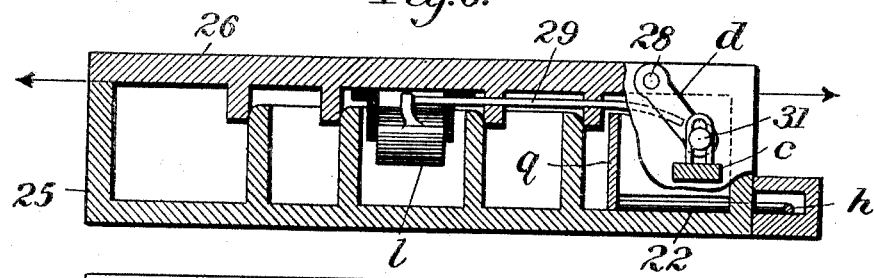
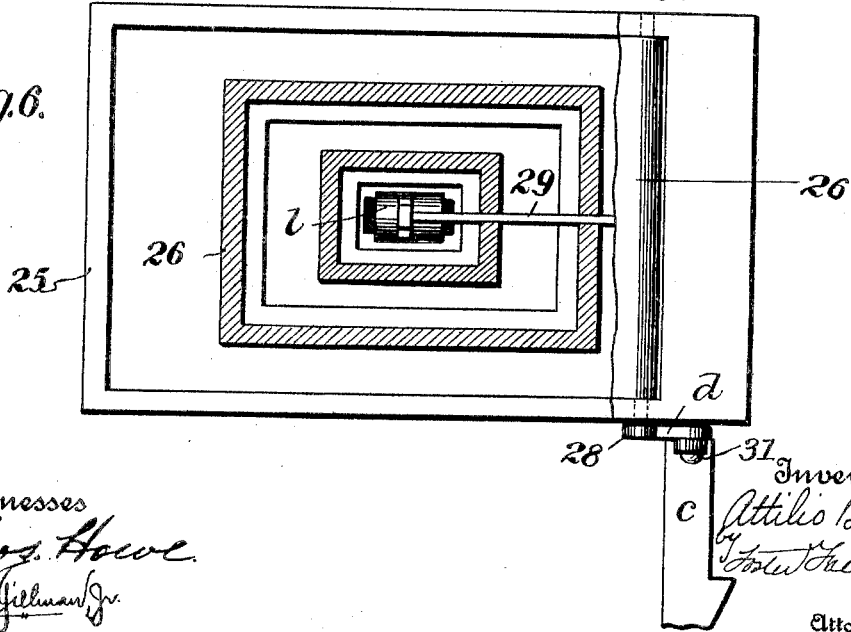

UNITED STATES PATENT OFFICE.

ATTILIO BEER, OF VENICE, ITALY.

MEANS FOR TRANSMITTING ELECTRICITY TO VEHICLES ON ELECTRIC RAILWAYS.

No. 797,254.　　　　Specification of Letters Patent.　　　　Patented Aug. 15, 1905.

Application filed August 18, 1902. Serial No. 120,139.

*To all whom it may concern:*

Be it known that I, ATTILIO BEER, a subject of the King of Italy, residing and having my post-office address at No. 4232 Campo Manin, Venice, Italy, have invented certain new and useful Improvements in Means for Transmitting Electricity to Vehicles on Electric Railways, of which the following is a specification.

This invention relates to means for conducting electricity from subterranean electric conductors to the motors of vehicles on electric railways, by which the third conducting-rail and the overhead conductor hitherto in use can be dispensed with. For this purpose current-transmitters are established at suitable distances along the line, which deliver the current supplied to them through a main circuit direct to a contact-rail carried by the vehicle and extending the full length of the vehicle.

In the accompanying drawings, Figure 1 is a side elevation, partly broken away and partly in section, of a portion of a tram-car and the means for conducting electricity from an underground conductor to a contact-rail on the car. Fig. 2 is a plan of the branch working conductor with the parts for moving the same. Fig. 3 is a vertical section. Fig. 4 is a detail view of the contact-rail. Fig. 5 is a vertical longitudinal section of the box containing the branch working conductor, and Fig. 6 is a horizontal section of the same.

The rails 18 18 are to be utilized for the return of the current, as usual, and therefore the escape-conductors and the corresponding contact-rails on the motor-car are dispensed with. The only contact-rail $a$ is placed beneath the motor-car A at a small height above the road-level and is connected with the positive terminals of the car-motors.

The current-transmitters $l$ are secured to the under sides of the covers 26 of a series of casings 25, placed at equal distances apart along the tram-road, each of these distances being a little less than the length of the contact-rail $a$. Normally the covers 26 are closed and level with the road-surface; but on the motor-car approaching each cover 26 is automatically turned upward through an angle of ninety degrees around its axle 28, so as to present the transmitter $l$ to the contact-rail $a$. When the motor-car has passed over, the cover 26 is allowed to again close and will then offer no obstacle to the traffic. This is done in the following manner: Each casing 25 is inclosed in a larger cast-iron casing 24, which is preferably hermetically closed. The main supply-conductor $h$ (see Fig. 5) is laid in a suitable conduit between the two rails and near one of them and is connected by branches 22 with leaf-springs $q$ inside the casings 25. Each transmitter $l$, which may be cylindrical or half-cylindrical, is insulated from the cover 26 and is connected with a wire 29, the end of which is so bent as to bear against the leaf-spring $q$ when the cover 26 is turned upward, so that the transmitter $l$ will thereby be electrically connected with the main supply-conductor $h$. When the cover 26 is closed, of course this connection is interrupted. On the axle 28 is fastened a lever $d$, carrying a pin 31. The latter engages in a slot on the end of a lever $e$, rocking around a pin 33. This lever $e$ is provided with an inclined face $h$, the purpose of which will be explained hereinafter. At right angles to the rails a shaft $f$ is mounted to turn in suitable bearings. On this shaft $f$ is fastened a lever $b$ of the shape shown at Fig. 1, which is guided at its end by a guide 37. Normally this lever $b$ occupies such a position (see Fig. 1 on the left) that its ridge is on the same level with the road-surface. On the other end of the shaft $f$ inside the casing 24 a small lever $g$ is fastened. When the motor-car A is assumed to move from right to left, its front wheel 39 will depress the lever $b$, and thereby turn the shaft $f$ with the lever $g$. Then the latter will strike against the inclined face $h$ of the lever $e$ and turn this lever, so that by its slot, the pin 31, the lever $d$, and the axle 28 the cover 26 will be turned upward. The current-transmitter $l$ is then ready for contact with the contact-rail $a$, the ends of which are preferably bent, as shown at Fig. 4. When the car has passed over, the contact-rail $a$ will no longer support the transmitter $l$, and the cover 26 will fall down. To keep water and dirt from the transmitter $l$, not only the external edge of the casing 25 is provided with an india-rubber packing, but also two internal partition-walls are provided inside the casing 25 and also on the cover 26 to form three chambers.

To enable the motor-car to also open the covers 26 when running in the opposite direction, other levers $b'$ will be arranged on the opposite side of the casing 24.

The casing 24 may be filled with oil to lubricate the mechanism contained therein.

What I claim as my invention, and desire to secure by Letters Patent, is—

1. The combination with an electric motor-vehicle and a contact-rail secured thereto, of a track for said vehicle, a main conductor extending along said track, tight boxes located along said track, adjacent boxes being distant from each other less than the length of said contact-rail and each box having a hinged lid, contacts, adapted for engagement with said rail, secured to the inner side of said lid, a contact within each of said boxes connected with said main conductor, means within each of said boxes for connecting the contact upon the lid with the contact connected with the main conductor when the said lid is opened, and means operated by the vehicle for opening said lid, substantially as described.

2. The combination with an electric motor-vehicle and a contact-rail secured thereto, of a track for said vehicle, a main conductor extending along said track, tight boxes located along said track, adjacent boxes being distant from each other less than the length of said contact-rail and each box having a hinged lid, contacts, adapted for engagement with said rail, secured to the inner side of said lid, a contact within each of said boxes connected with said main conductor, means within each of said boxes for connecting the contact upon the lid with the contact connected with the main conductor when the said lid is opened, and means operated by a wheel of the vehicle for opening said lid, substantially as described.

In testimony whereof I have signed my name to this specification in the presence of two subscribing witnesses.

ATTILIO BEER.

Witnesses:
H. A. JOHNSON,
J. J. WALSH.